Patented Aug. 1, 1950

2,517,410

UNITED STATES PATENT OFFICE 2,517,410

HYDROXY ALKYL XANTHINES AND THE PRODUCTION THEREOF

Viktor Papesch, Morton Grove, Ill., assignor to G. D. Searle & Co., Skokie, Ill., a corporation of Illinois No Drawing. Application August 15, 1947, Serial No. 768,929

10 Claims. (Cl. 260—256)

This invention relates to xanthines containing hydroxyalkyl substituents, and to processes for preparing the same. It particularly relates to hydroxyalkyxanthines of the following general formula:

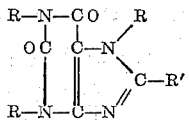

wherein one R is hydrogen, one R is a hydroxyalkyl radical and the third R and R' are members of the group consisting of hydrogen, hydroxyalkyl and alkyl radicals.

For many years, the naturally occurring methylated xanthines, theophylline, theobromine and caffeine, have found wide use in therapeutics. Generally speaking, the two dimethyl compounds, theophylline and theobromine, have somewhat similar therapeutic utility in that both are used primarily as vasodilators and diuretics, with little if any central stimulating action. When a third methyl group is introduced, forming caffeine, the action is changed so that the compound is primarly a central stimulant. Any residual vasodilator or diuretic properties which caffeine may have are unavailable for practical use inasmuch as any dose large enough to exhibit such properties will at the same time exhibit undesirably great central stimulating properties.

In the xanthine molecule, there are three nitrogen atoms (conventionally numbered 1, 3 and 7) to which are attached salt-forming (or acidic) hydrogen atoms, which hydrogen atoms are capable of being replaced by alkyl or substituted alkyl groups. When such groups are introduced in place of the hydrogen atom, the salt-forming properties inherent in that portion of the molecule vanish. Thus a monoalkyl xanthine has two such salt-forming hydrogen atoms left in the molecule; dialkyl xanthines (of which theophylline and theobromine are examples) have one salt-forming hydrogen, while trialkyl xanthines, such as caffeine, have no salt-forming properties at all. In an attempt to improve the properties of theophylline and of theobromine, earlier workers have introduced a hydroxyethyl group onto the remaining unsubstituted nitrogen atom in these molecules, resulting in the formation of 7-beta-hydroxyethyl-1,3-dimethylxanthine and 1-beta-hydroxyethyl-3,7-dimethylxanthine respectively. However, such substitution immediately changes the nature of the compound from a disubstituted, salt-forming theophylline-like compound to a tri-substituted, neutral caffeine-like compound.

I have now found in this invention that useful and improved therapeutic compounds can be obtained by preparing hydroxyalkylxanthines which resemble theophylline or theobromine in that they contain at least one unsubstituted nitrogen atom with its salt-forming hydrogen atom, but in which at least one of the alkyl groups substituted on the remaining nitrogen atom has one or more hydroxyl groups.

In the compounds of the above general formula, one R represents a hydroxyalkyl radical wherein at least 2 carbon atoms separate the hydroxyl group and the nitrogen atom of the xanthine ring. Among the preferred substances are those containing in the 3-position a beta-hydroxyethyl radical. Other hydroxyalkyl substituents are suitable, among them being beta-hydroxypropyl, beta-gamma-dihydroxypropyl, gamma-hydroxypropyl, gamma-hydroxybutyl, beta-hydroxybutyl and related substituents. The aliphatic radicals represented by R and R' include the lower alkyl radicals such as methyl, ethyl, propyl, butyl, amyl and their isomers, as well as mono- and polyhydroxyalkyl radicals such as those discussed hereinbefore.

The compounds to which this invention relates may be used in the form of the free xanthine or they may be converted to suitable salts with organic amines such as ethanolamine, diethanolamine, ethylenediamine, isopropylamine, diethylaminoethanolamine, diethylamine and the like. They may also be used in the form of their esters with aliphatic acids such as the lower fatty acids.

My invention is further disclosed by the following examples, which are intended only as illustrations and which in no way limit my invention in spirit or in scope.

Example 1

100 grams of 3-beta-hydroxyethyl-4,5-diaminouracil and 500 cubic centimeters of formic acid are mixed and heated until dissolved. A small amount of zinc dust is added to prevent oxidation. The mixture is boiled for 2 hours. It is then evaporated on a steam bath until solid forms. The residue is taken up in 700 cc. of water, treated with decolorizing charcoal and filtered. On cooling a precipitate forms. This is removed by filtration, washed with a small amount of cold water and dissolved in 300 cc. of warm water containing 40–50 g. of calcium oxide. The resulting mixture is refluxed for 2 hours. The mixture is acidified with concentrated hydrochloric acid and cooled. The precipitate of 3-beta-hydroxyethylxanthine is collected on a filter, washed and recrystallized from water, using decolorizing charcoal. The product thus obtained melts at about 290–292° C. (uncorrected) and has the formula

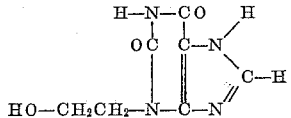

Example 2

25 g. of 3-beta-hydroxyethyl-4,5-diaminouracil and 200 cc. of acetic anhydride are refluxed for 2½ hours. The mixture is cooled and filtered. The precipitate is washed by suspension in 100 cc. of water and filtration. It is then recrystallized from 500 cc. of water, using decolorizing charcoal (melting point about 283–285° C., uncorrected). The 3-beta-hydroxyethyl-8-methylxanthine acetate so obtained is then refluxed with an excess of calcium oxide for about 6½ hours. Upon neutralization of the solution 3-beta-hydroxyethyl-8-methylxanthine precipitates. After recrystallization from water it melts at about 335° C. (uncorrected). It has the formula

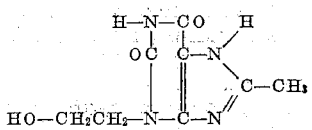

Example 3

200 g. of 3-beta-hydroxyethyl-4-aminouracil are dissolved in 60 cc. of 50% sodium hydroxide solution and 600–700 cc. of water. The solution is stirred while 127 cc. of dimethyl sulfate are added in portions. Near the end of the addition the mixture heats itself to 90–100° C. and has to be cooled before the rest of the dimethyl sulfate is added. Then a small amount of alkali is added to make the mixture weakly alkaline. When the addition is complete the mass is cooled and filtered. The filter cake is washed by suspension in ice water and filtration.

120 g. of 3-beta-hydroxyethyl-1-methyl-4-aminouracil in 1 liter of water are nitrosated by the addition of 45 g. of sodium nitrite, boiling and then the addition of 45 cc. of glacial acetic acid. The charge is heated for a few minutes. On chilling, a precipitate of the nitroso compound forms which is collected on a filter.

Into 224 cc. of 28% ammonium hydroxide and 450 cc. of ice is passed hydrogen sulfide until the uptake is 55 g. The solution is then heated to boiling and 112 g. of the above nitroso compound are added in small portions. The mixture is boiled for 2½ hours, then filtered with the aid of decolorizing charcoal. The filtrate is evaporated on the steam bath until nearly dry. There is obtained in this way crystalline 1-methyl-3-beta-hydroxyethyl-4,5-diaminouracil.

98.5 g. of the above compound are refluxed with 400 cc. of formic acid for 3 hours. The formic acid is then removed by vacuum distillation and the residue is taken up in about 1 liter of water. The mixture is filtered to remove sulfur and 90 g. of calcium oxide are added to the filtrate. The suspension is boiled for 2 hours. The resulting solution is made slightly acid with concentrated hydrochloric acid and a precipitate forms. The charge is chilled and filtered. The 1-methyl-3-beta-hydroxyethylxanthine is washed with water and dilute alcohol, and then recrystallized from water with the aid of decolorizing charcoal. The product thus obtained melts at about 279° C. (uncorrected) and has the formula

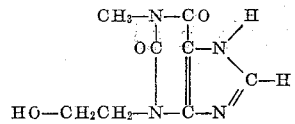

Example 4

24.5 g. of 3-beta-hydroxyethylxanthine (Example 1) in 53 cc. of 10% sodium hydroxide and 50 cc. of water are warmed to 65° C. and 12 g. of ethylene chlorohydrin are added. The mixture is heated in a closed system at 110–155° C. for 4½ hours. The charge is removed and evaporated on a steam bath until dry. The residue is crushed under 95% alcohol and boiled in 1 liter of alcohol for 15 minutes. The mixture is filtered with activated carbon and the filtrate chilled. The crystalline precipitate is recrystallized once more from 800 cc. of alcohol. There is obtained 3,7-di-beta-hydroxyethylxanthine of M. P. about 214–216° C. (uncorrected). It has the formula

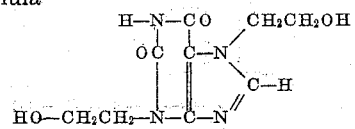

Example 5

30 g. of 3-beta-hydroxyethyl-4,5-diaminouracil and 300 cc. of propionic anhydride are thoroughly mixed until dissolved and then heated to reflux for 2 hours. The charge is chilled and filtered. A sample of the solid filter cake of 3-beta-hydroxyethyl-8-ethylxanthine propionate is recrystallized from water (uncorrected M. P. about 280° C.) and then the rest is suspended in hot water on which an excess of calcium oxide is added. The mixture is boiled for 2 hours and then neutralized with mineral acid. The precipitate of 3-beta-hydroxyethyl-8-ethylxanthine is collected on a filter, recrystallized from water and melts at about 340° C. (uncorrected). It has the formula

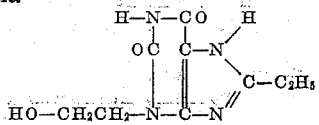

Example 6

20 g. of 3-beta-hydroxyethylxanthine (Example 1), 60 cc. of 10% sodium hydroxide and 100 cc. of water are warmed to effect solution, then cooled to 45° C. and stirred while 15 g. of dimethyl sulfate are added dropwise in 20 minutes. The charge is heated to 100° C., treated with decolorizing charcoal, filtered and cooled to 20° C. Dilute mineral acid is added to neutralize the filtrate and crystallization ensues. The mass is chilled thoroughly and then filtered. The 3-beta-hydroxyethyl-7-methylxanthine thus isolated is recrystallized from water with the use of a filter aid and melts at about 245° C. (uncorrected). It has the formula

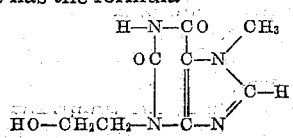

Example 7

22.7 g. of 3-methylxanthine in 55 cc. of 10% sodium hydroxide and 110 cc. of water are heated at 90–100° C. with 18 g. of glycerol monochlorohydrin for about 2 hours. The reaction mixture is filtered. The filtrate is evaporated and the residue is collected on a filter and washed with a small amount of cold water and then dissolved in 700 cc. of alcohol. The solution is boiled with decolorizing charcoal, chilled, filtered, concentrated and chilled. The precipitate of 3-methyl-7-beta,gamma-dihydroxypropylxanthine is recrystallized from alcohol and melts at about 286–288° C. (uncorrected). It has the following formula

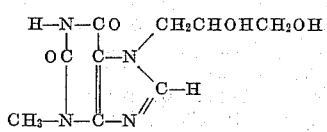

Example 8

19.6 g. of 3-beta-hydroxyethylxanthine, 8 g. of ethylenechlorohydrin and 56 cc. of 5% sodium hydroxide are mixed and heated in a sealed tube at 100–125° C. for 5½ hours. The reaction mixture is evaporated until crystallization begins and then chilled. The crystals are dissolved in 300 cc. of hot alcohol, filtered, and the filtrate cooled in ice. The crystals of 3,7-di-beta-hydroxyethylxanthine which separate are collected and recrystallized from alcohol, and melt at about 214–216° C. (uncorrected). The product has the formula

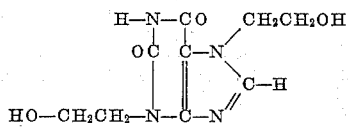

Example 9

10 g. of 1-methylguanine are dissolved in 30 cc. of 10% sodium hydroxide and heated in a sealed tube at about 125° C. with 5.5 g. of ethylene chlorohydrin for 2½ hours. The precipitate which forms is removed by filtration and recrystallized twice from water, using decolorizing charcoal. The 1-methyl-7-beta-hydroxyethylguanine is dried at 140° C. and melts at about 250° C. (uncorrected) with sintering from about 225° C. It has the formula

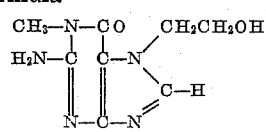

Example 10

70 g. of 3-methyl-4-aminouracil and 60 g. of ethylene chlorohydrin are heated together in a closed vessel at 120° C. in the presence of 30 g. of sodium hydroxide in 500 cc. of water for 2½ hours. The charge is filtered and the filter cake is washed with water and dried. The solid 1-beta-hydroxyethyl-3-methyl-4-aminouracil thus obtained is recrystallized from water with the aid of activated charcoal. It melts at about 270–272° C. (uncorrected).

51 g. of 1-beta-hydroxyethyl-3-methyl-4-aminouracil is nitrosated by solution in 500 cc. of boiling water, followed by addition of 19 g. of sodium nitrite and 18.2 cc. of glacial acetic acid. The resulting mixture is cooled and filtered to remove the 1-beta-hydroxyethyl-3-methyl-4-amino-5-nitrosouracil, which is washed with water and dried.

A mixture of 100 cc. of 28% ammonia water and 200 g. of ice is treated with hydrogen sulfide until 25 g. are taken up. To this solution are added 50 g. of the above nitroso compound. After the addition, the mixture is boiled for two hours, then filtered and evaporated. The residue of 1-beta-hydroxyethyl-3-methyl-4,5-diaminouracil obtained by this procedure is heated with 170 cc. of formic acid until dissolved. The hot mixture is treated with charcoal and filtered. The filtrate is refluxed for 2½ hours. The solution is evaporated in vacuum. The hot solution is diluted with 150 cc. of hot water, treated with charcoal and filtered. 30 g. of calcium oxide are added to make the mixture strongly alkaline, and the resulting solution is boiled 3½ hours. During this boiling period sufficient calcium oxide (about 10 g.) is added to maintain alkalinity. The cooled solution is brought to pH 4 with hydrochloric acid, cooled with ice, and allowed to crystallize. The crystals of 1-beta-hydroxyethyl-3-methylxanthine are removed by filtration and recrystallized from water, using activated charcoal. The compound melts at about 235–245° C. (uncorrected) and has the formula

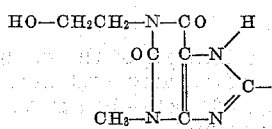

Example 11

9.8 g. of 3-beta-hydroxyethylxanthine and 6.6 g. of glycerol monochlorohydrin are heated together with 24 cc. of 10% sodium hydroxide and 24 cc. of water at 120–130° C. for 4½ hours in a pressure vessel. The mixture is filtered and evaporated on a steam bath, then under vacuum. The residue is extracted repeatedly with hot absolute alcohol and allowed to crystallize. The crystalline precipitate of 3-beta-hydroxyethyl-7-beta,gamma-dihydroxypropylxanthine which is obtained by evaporation of the reaction mixture is removed by filtration, recrystallized twice from about 300 cc. of 95% alcohol with the aid of decolorizing charcoal, and dried at 65° C. in vacuum. It has the formula

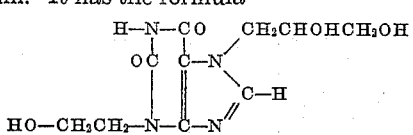

I claim:

1. A xanthine having attached to its nitrogen atoms in positions 1, 3 and 7 not more than two hydroxyalkyl radicals and at least one hydrogen atom.

2. A hydroxyalkylxanthine having the formula

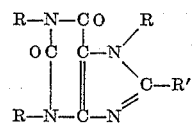

wherein one R is hydrogen, one R is a hydroxyalkyl radical and the third R and R' are members of the group consisting of hydrogen, hydroxyalkyl and alkyl radicals.

3. A 3-hydroxyalkylxanthine having the formula

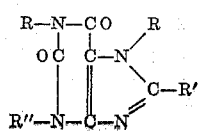

wherein R″ is a hydroxyalkyl radical, one R is hydrogen, and the other R and R′ are members of the group consisting of hydrogen, hydroxyalkyl and alkyl radicals.

4. A 3-beta-hydroxyethylxanthine having the formula

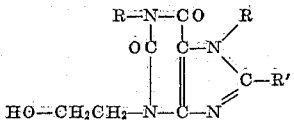

wherein one R is hydrogen, and the other R and R′ are members of the group consisting of hydrogen, hydroxyalkyl and alkyl radicals.

5. A 3-beta-hydroxyethylxanthine having the formula

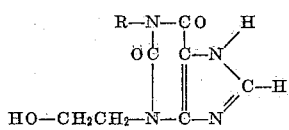

wherein R is a member of the group consisting of hydrogen, hydroxyalkyl and alkyl radicals.

6. 1 - methyl - 3 - beta - hydroxyethylxanthine, which has the formula

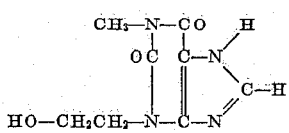

7. 3-beta-hydroxyethylxanthine, which has the formula

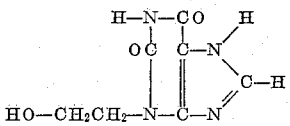

8. The process of preparing a hydroxyalkylxanthine which comprises heating a 4,5-diaminouracil having at least one nitrogen atom substituted with a hydroxyalkyl radical with an alkanoic acid, hydrolyzing the product so obtained with an inorganic base, and precipitating the hydroxyalkylxanthine with acid.

9. The process of preparing a 3-beta-hydroxyethylxanthine which comprises heating a 3-beta-hydroxyethyl-4,5-diaminouracil with an alkanoic acid, hydrolyzing the product so obtained with an inorganic base and precipitating the 3-beta-hydroxyethylxanthine with acid.

10. The process of preparing 1-methyl-3-beta-hydroxyethylxanthine which comprises heating 1-methyl-3-beta-hydroxyethyl-4,5-diaminouracil with formic acid, hydrolyzing the product thus formed with aqueous calcium hydroxide and precipitating the 1-methyl-3-beta-hydroxyethylxanthine with mineral acid.

VIKTOR PAPESCH.

REFERENCES CITED

The following references are of record in the file of this patent:

UNITED STATES PATENTS

| Number | Name | Date |
|---|---|---|
| 716,994 | Engelmann | Dec. 30, 1902 |
| 874,825 | Berendes et al. | Dec. 24, 1907 |